United States Patent [19]

Maltz

[11] Patent Number: 4,827,253

[45] Date of Patent: May 2, 1989

[54] VIDEO COMPOSITING USING A SOFTWARE LINEAR KEYER

[75] Inventor: Ivan J. Maltz, Boonton, N.J.

[73] Assignee: Dubner Computer Systems, Inc., Paramus, N.J.

[21] Appl. No.: 249,215

[22] Filed: Sep. 26, 1988

Related U.S. Application Data

[63] Continuation of Ser. No. 50,448, May 18, 1987, abandoned.

[51] Int. Cl.$^4$ .............................................. G09G 1/00
[52] U.S. Cl. ..................................... 340/734; 340/703; 358/183; 358/22
[58] Field of Search ............... 340/730, 734, 735, 748, 340/790, 701, 703; 358/183, 22

[56] References Cited

U.S. PATENT DOCUMENTS

| | | | |
|---|---|---|---|
| 4,420,770 | 12/1983 | Rahman | 358/183 |
| 4,432,016 | 2/1984 | Shanley, II et al. | 358/183 |
| 4,568,981 | 2/1986 | Beaulier | 358/183 |
| 4,689,681 | 8/1987 | Jackson | 358/183 |
| 4,698,666 | 10/1987 | Lake, Jr. et al. | 358/183 |
| 4,779,135 | 10/1988 | Judd | 358/183 |

Primary Examiner—Donald J. Yusko
Assistant Examiner—Jeffery A. Brier
Attorney, Agent, or Firm—Francis I. Gray

[57] ABSTRACT

A method for compositing a graphic image with a background image to produce translucent effects identifies a key signal for each portion of the graphic image. The key signal is varied according to the amount of translucency desired for the graphics image from completely transparent to completely opaque. When the graphic image is mixed with the background image, the key signal is used to define the ratio of the graphic image to the background image at each part of the graphic image to produce a mixed image output.

4 Claims, 3 Drawing Sheets

VIDEO COMPOSITING USING A SOFTWARE LINEAR KEYER

This is a continuation of application Ser. No. 050,448, filed May 18, 1987, and now abandoned.

BACKGROUND OF THE INVENTION

The present invention relates to video compositing systems, and more particularly to video compositing systems using a software controlled linear keyer for a character generator which provides anti-aliased characters, translucent letters and fades and dissolves without requiring an external switcher or keyer.

In a video production environment one video source must often be matted or composited over a second video source. A video keyer is generally used to produce the composite image. Character generators and other graphic devices often supply a key signal in addition to their normal color outputs. The key signal is used to cut a hole in the background video. When viewed on a monitor the key signal looks like a high contrast, black and white version of the graphic image. The key signal is white for the portions of the screen where the graphic image would obscure the background video, and black where the background video is to be seen. The key signal and color outputs are input to a video keyer which uses the key signal to switch between the foreground graphic image, and a background video source to produce a single video signal output, the matted video.

Key signals produced by traditional graphic devices have been hard edged, i.e., the foreground video source is either on or off and never in-between as illustrated in FIG. 1A. Unfortunately the sharp transition between foreground and background video can cause "chroma-creep" and other distracting artifacts in the composite image. Soft keyers were developed to soften the edge between foreground and background video. Two controls, clip and gain, transform the sharp-edged hard key signal into a smooth, ramped key signal. The clip control chooses a threshold value above which the key signal is considered on and below which the key signal is considered off. The gain control specifies the slope of the output key signal. The ramped key signal, illustrated in FIG. 1B, is then fed to a linear keyer to produce a weighted average between the foreground and background video based on the luminance level of the incoming key signal.

The jagged edges produced by traditional character generators are caused by the hard transition between background video and foreground characters. These transitions take place at pixel boundaries, typically 25 to 50 nanoseconds apart. A properly anti-aliased character has its edges blended with the background. The amount of blending varies from pixel to pixel and depends upon the shape of the character. The anti-aliasing computations required for a self-contained graphic display, i.e., no background video, use well know digital signal processing techniques. Soft keyers reduce the "jaggies" by blurring the edges of the characters. Since a soft keyer has no knowledge about the true shape of a character, aliasing artifacts still exist. Correct anti-aliasing requires that the near vertical edges of a character exhibit a fast transition, one or two pixels from off to on, while near horizontal edges exhibit a slow transition, as long as twenty pixels. Serious problems are often encountered when an anti-aliased display is matted over background video. A hard keyer fringes the foreground graphic with its original background color. Although a soft keyer mutes this problem somewhat, it still allows portions of the original background color to bleed through.

What is desired is a video compositing system which eliminates anti-aliasing artifacts while providing the capability of performing new compositing effects independent of external video keyers.

SUMMARY OF THE INVENTION

Accordingly the present invention provides a video compositing system using software control of an integrated linear keyer. A graphic generator features a large run-length-encoded frame buffer, a palette look-up table and an integrated linear keyer. The output of the palette look-up table is a digital data word for each component color and for key. All four signals are converted to analog, the color components are encoded into a desired standard television video signal, and the video signal and the key signal are routed to a linear keyer. The key signal provides a translucency value for the color from the encoder for novel effects, provides knowledge of the shape of the character or graphic image for improved anti-aliasing, and is used for dissolves and fades by varying the key values in the palette look-up table.

The objects, advantages and other novel features of the present invention will be apparent from the following detailed description when read in conjunction with the appended claims and attached drawing.

DESCRIPTION OF THE PREFERRED EMBODIMENT

Figure 2:
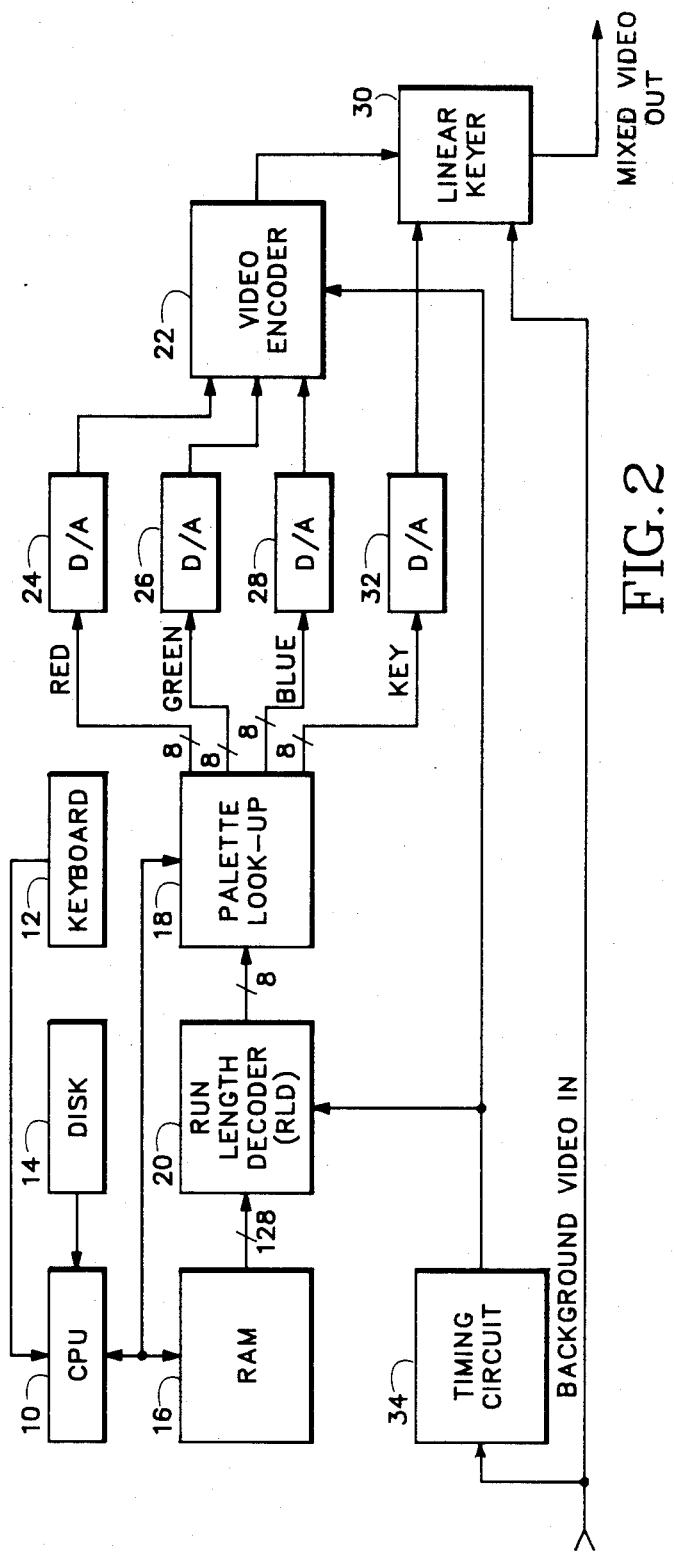
FIG. 2 is a block diagram of a video compositing system using an integrated linear keyer according to the present invention.

Referring now to FIG. 2 a central processing unit (CPU) 10 receives inputs from an operator via a keyboard 12 or from a bulk memory 14, such as a magnetic disk. Connected to the CPU 10 are a random access memory (RAM) 16 and a palette look-up table 18. A run length decoder (RLD) 20 is inserted between the RAM 16 and the palette look-up table 18 since the graphic image stored in the RAM is in a "run-length-encoded" format. The outputs of the palette look-up table 18 are three primary color components and a key signal. The three primary color components are input to a video encoder 22 via respective digital to analog (D/A) converters 24, 26, 28 to produce a graphic image to be composited with an input background video. A linear keyer 30 receives as inputs the background video, the graphic image from the video encoder 22 and the key signal via D/A converter 32 to output a mixed, or composited, video output. Timing for the video compositing system is provided by a timing circuit 34 which derives from the background video all necessary timing signals to be applied to the RLD 20 and the video encoder 22 to assure synchronization of the graphic image with the background video.

Figure 1A:
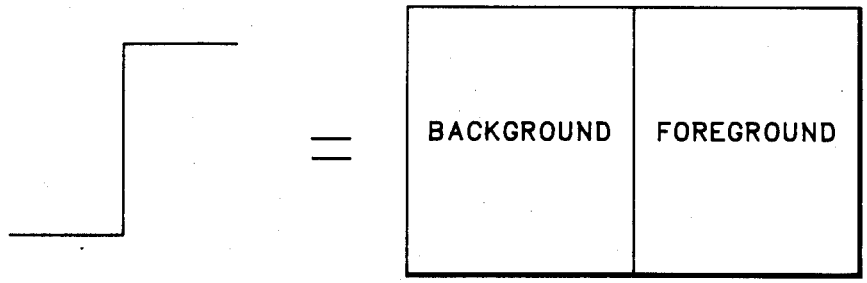
FIGS. 1A and 1B illustrate a hard and a soft key according to the prior art.
Figure 1B:
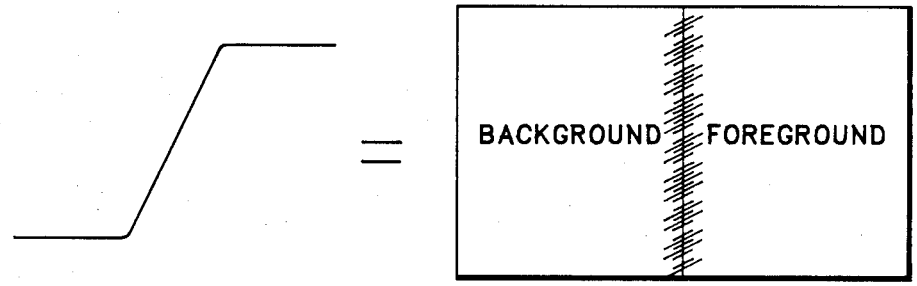
Figure 4:
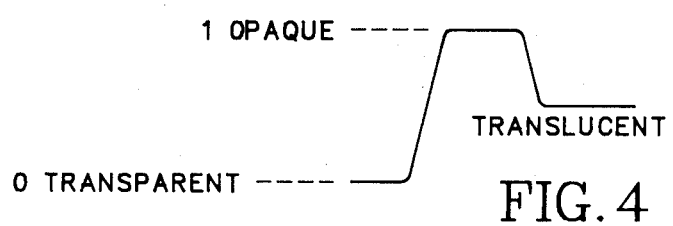
FIG. 4 illustrates a key according to the present invention for providing a translucent effect.
Figure 3A:
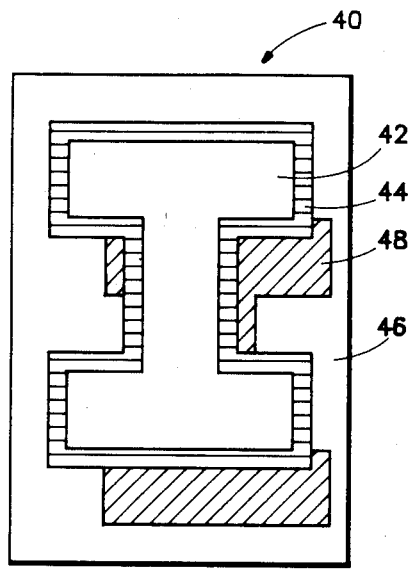
FIGS. 3A, 3B, 3C and 3D illustrate a graphic image with different video effects produced by the present invention.
Figure 3B:
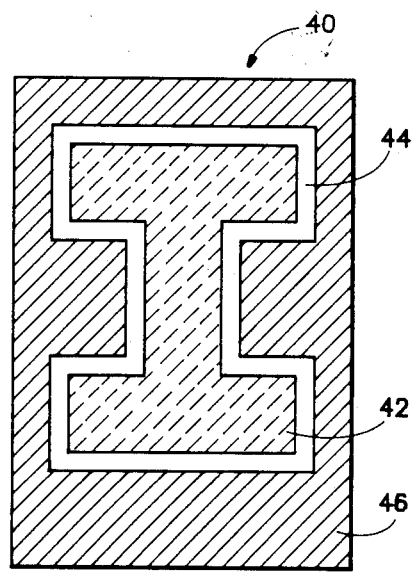

For a character generator a typical character graphic image 40 is shown in FIG. 3A. The character graphic image 40 has a foreground portion 42 surrounded by an edge portion 44. The image 40 is presented against a screen 46 and includes a drop shadow portion 48 projected upon the screen. In prior character generators the character image 40 is blended with the screen 46 and provided to an external switcher, or video keyer, to matte with the external, background video. However by providing an internal key signal as well as the color palette information in the palette look-up table 18, and by using an integrated software linear keyer 30, the character graphics image 40 may be blended with the external background video directly to produce not just an improved anti-aliased graphics image, but several special video effects. One such effect is illustrated in different embodiments in FIGS. 3B, 3C and 3D. The key value supplied from the palette look-up table 18 as part of a color can be considered the translucency of the color. As shown in FIG. 4 a key value of zero indicates the color is transparent, i.e., the background video is completely visible, and the maximum key value creates an opaque color completely obscuring the background video. Intermediate key values produce translucent colors by allowing part of the background video to bleed through. In FIG. 3B the character graphic image 40 is illustrated as being translucent in the foreground portion 42 by the dotted continuation lines corresponding to the shading lines for the screen 46. The key signal values in the palette look-up table 18 for this character provide a maximum key value for the edge portion 44, which is opaque, and an intermediate key value for the foreground portion 42 so that the foreground portion, when matted with the external background video in the linear keyer 30, produces a translucent effect, i.e., a portion of the background video shows through the foreground portion. The foreground portion 42 could even be multi-colored to produce tinting or shading effects.

Figure 3C:
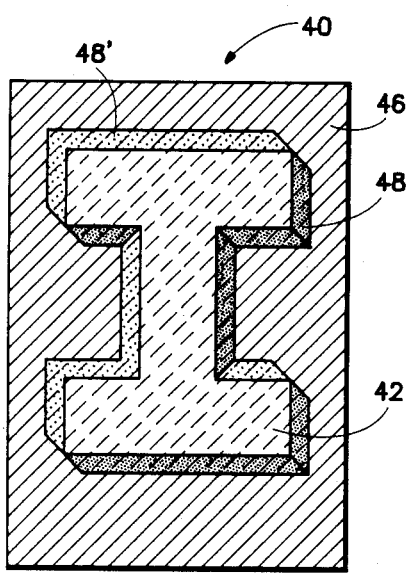
Figure 3D:
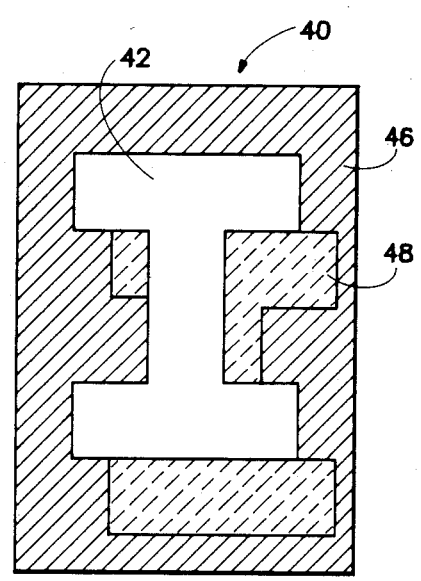

Likewise for FIG. 3C an embossed, translucent effect may be achieved by using the foreground portion 42, the drop shadow portion 48, and a reverse drop shadow portion 48'. The key signal for each portion has a different value. For instance the key value for the foreground portion 42 could produce a quite translucent effect, the key value for the reverse drop shadow portion 48' could produce a more opaque effect, and the key value for the drop shadow portion 48 an even more opaque effect. Further the two drop shadows 48, 48' could be assigned respectively a dark color and a light color. Finally FIG. 3D illustrates a true background shadow achieved by using the key signal to generate an opaque foreground portion 42 and a translucent drop shadow 48.

Each pixel of the character graphic image 40 is either one hundred percent of one component, foreground 42, edge 44, drop shadow 48 or screen 46, or a blend of two adjacent components. The six possible pairings are: foreground-edge, foreground-shadow, foreground-screen, edge-shadow, edge-screen and shadow-screen. If a component pair can save fifteen intermediate blends, a character graphic image 40 can use a maximum of $15 \times 6 + 4 = 94$ possible colors. In practice the number of intermediate blends can be limited to seven, allowing an anti-aliased, edged and shadowed character to be displayed using about fifty palette look-up table entries. If a component pair does not include screen color, its key value is set to a fully opaque value. If one of the components is screen color, the key value indicates the percentage of screen color for that pixel. A lower key value specifies that a higher percentage of background video should be blended by the linear keyer 30. The red, green and blue values stored in the palette look-up table 18 are taken entirely from the non-screen color so that the resulting mixed output does not include any of the internally generated screen color, eliminating the screen bleed or fringing problem.

Fade and dissolve effects can also be generated by the character generator by varying the key values for the entire palette look up table 18. When all the key values are maximum, only the graphic image is seen. As the key values are gradually reduced, the external background video mixes with the foreground graphics image until, when the key value reaches zero, only the background video remains. If the foreground image has any translucent areas, the rate of variation of the key values for such areas can be made different than the rate for opaque areas so that the image fades evenly. Of course the converse can be done, resulting in a foreground graphic image fading in over a background video. Also different portions of the graphic image may be faded independently.

In operation an operator at the keyboard 12 interacts with the CPU 10 to generate a graphics image to be matted over the external background video. The bulk memory 14 is accessed by the CPU 10 for standard images such as character fonts. The RAM 16 provides a program portion containing the executable software code, a temporary storage portion for interim processing results, and a display generation portion. The RLD 20 converts the run-length-encoded display information from the RAM 16 into a series of two byte segments. One byte from the RLD 20 is a color address word for the palette look-up table 18, and the other byte is a pixel duration count indicating the number of pixels for which that color is output. The palette look-up table 18 is loaded via information from the bulk memory 14 and modified as desired by operator interaction via the keyboard 12. The information for each color location of the palette look-up table 18 includes a value for each of the primary colors, red, green and blue, and a key value. The primary colors are combined in the video encoder 22 to produce the proper encoded color output. The encoded color output is blended with the background video in the linear keyer 30 according to the associated key value. The operator, by varying the key value contents of the palette look-up table 18, can produce the desired video effects discussed above. Also by combining the graphic image directly with the background video rather than first blending it with a screen, the anti-aliasing characteristics are improved.

Thus the present invention provides a video compositing system using an integrated software controlled linear keyer which allows for improved anti-aliasing of graphic images as well as special video effects by associating a key value for each color value in a palette look-up table, the key value being variable according to program control in response to operator interaction. The key value serves to blend the graphic image with the background video to produce a matted output video.

What is claimed is:

1. An apparatus comprising:
    means for defining a graphics image in an encoded form;
    means for providing a key signal in the form of a look-up table value for each portion of the graphics image according to a desired graphics effect;
    means for programming the look-up table value independently for each portion of the graphics image to produce the desired graphics effect; and
    means for combining the graphics image with a background image according to the key signal to produce a mixed image output incorporating the desired graphics effect.

2. A method for providing translucency of a graphic image comprising the steps of:
    defining a key signal in the form of a look-up table value for each portion of the graphic image according to a desired translucency;
    programming the look-up table value independently for each portion of the graphics image according to the desired translucency; and
    mixing the graphic image with a background image in a proportion determined by the key signal at each portion of the graphics image to produce a mixed image output wherein the graphic image has the desired translucency.

3. A graphics generator comprising:
    means for storing a data representation of a graphics image to be composited with a background video signal to produce a desired video effect;
    means for decoding the data representation to produce a color address;
    means for outputting an encoded video signal representing the graphics image and an associated variable key signal in response to the color address;
    means for programming the variable key signal on a pixel by pixel basis in the outputting means as a function of the desired video effect; and
    means for combining the encoded video signal and the background video signal according to the variable key signal to produce a composited video signal representing the desired video effect.

4. An improved graphics generator of the type having a memory for storing encoded data representing a graphic image, a decoder for decoding the encoded data to produce a color address, a palette look-up table for outputting color components corresponding to the color address, and means for combining the color components to form an encoded video signal corresponding to the graphic image, wherein the improvement comprises:
    means for storing programmable key values in the palette look-up table so that when the palette look-up table is addressed by the color address a variable key signal is output according to a desired video effect; and
    a linear keyer having the encoded video signal, a background video signal and the variable key signal as inputs and a composited video signal as an output, the composited video signal being a function of the variable key signal whereby the desired video effect is produced.

* * * * *